United States Patent
Chen

(10) Patent No.: US 12,061,557 B2
(45) Date of Patent: Aug. 13, 2024

(54) METHOD FOR STORING L2P TABLE, SYSTEM, DEVICE, AND MEDIUM

(71) Applicant: INSPUR SUZHOU INTELLIGENT TECHNOLOGY CO., LTD., Jiangsu (CN)

(72) Inventor: Qinglu Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/034,541

(22) PCT Filed: Sep. 29, 2021

(86) PCT No.: PCT/CN2021/121914
§ 371 (c)(1),
(2) Date: Apr. 28, 2023

(87) PCT Pub. No.: WO2022/141471
PCT Pub. Date: Jun. 16, 2022

(65) Prior Publication Data
US 2024/0020240 A1     Jan. 18, 2024

(30) Foreign Application Priority Data

Dec. 11, 2020  (CN) .......................... 202011437985.6

(51) Int. Cl.
*G06F 12/02* (2006.01)
*G06F 12/1027* (2016.01)
*G06F 11/14* (2006.01)

(52) U.S. Cl.
CPC ...... *G06F 12/1027* (2013.01); *G06F 12/0238* (2013.01); *G06F 12/0246* (2013.01); *G06F 11/1471* (2013.01); *G06F 2212/7201* (2013.01)

(58) Field of Classification Search
None
See application file for complete search history.

(56) References Cited

U.S. PATENT DOCUMENTS 9,671,971 B2 *  6/2017  Trika .................. G06F 12/1466
11,030,089 B2 * 6/2021  Boals ................. G06F 12/0246
(Continued)

FOREIGN PATENT DOCUMENTS

| CN | 107402724 A | 11/2017 |
|---|---|---|
| CN | 107422992 A | 12/2017 |

(Continued)

*Primary Examiner* — Nathan Sadler
(74) *Attorney, Agent, or Firm* — IPro, PLLC

(57) ABSTRACT

The present disclosure provides a method for storing an L2P table, including the following steps: detecting the L2P table, in response to detecting update of the L2P table, acquiring a logical block address (LBA) for which a mapping relation is updated in the L2P table; sending the LBA to a journal manager; reading a corresponding physical block address (PBA) in the L2P table according to the received LBA and assembling the LBA and the corresponding PBA into delta data in response to the journal manager receiving the LBA; and saving the delta data and several basic data currently to be saved in the L2P table as a snapshot in a non-volatile memory. The present disclosure further provides a system, a computer device, and a readable storage medium.

20 Claims, 3 Drawing Sheets

(56) References Cited

U.S. PATENT DOCUMENTS

| | | | |
|---|---|---|---|
| 2019/0018601 A1 | 1/2019 | Dubeyko | |
| 2021/0073139 A1* | 3/2021 | Sheridan | G06F 12/0646 |
| 2021/0081284 A1* | 3/2021 | Watt | G06F 11/076 |
| 2022/0100608 A1* | 3/2022 | Yu | G06F 11/1446 |

FOREIGN PATENT DOCUMENTS

| | | |
|---|---|---|
| CN | 109213690 A | 1/2019 |
| CN | 110647295 A | 1/2020 |
| CN | 112631950 A | 4/2021 |

* cited by examiner

METHOD FOR STORING L2P TABLE, SYSTEM, DEVICE, AND MEDIUM

CROSS-REFERENCE TO RELATED APPLICATIONS

This application claims the benefit of priority to Chinese Patent Application No. 202011437985.6, titled "METHOD, SYSTEM, DEVICE FOR STORING L2P TABLE AND MEDIUM", filed on Dec. 11, 2020 with China National Intellectual Property Administration, which is incorporated herein by reference in its entirety.

TECHNICAL FIELD

The present disclosure relates to the field of solid state disks (SSD), in particular to a method, system, device for storing an L2P table and a storage medium.

BACKGROUND

A flash translation layer (FTL) mapping table, also known as a logical to physical (L2P) table, is used for realizing a mapping from a logical block address (LBA) space of a host to a physical block address (PBA) space of a flash memory, and is one of the core metadata in SSD management data. The L2P table is a linear table with LBA as index and PBA as content. When an SSD is operating, each piece of user data is flashed into the address space of the flash memory, and the mapping relation from the logical address to the physical address is recorded in the L2P table. When the host reads the data, the LBA of the data is sent to the SSD, and the SSD can search the L2P table based on the LBA, find a corresponding physical space block address (PBA) of the flash memory, read out the piece of data stored on the Flash, and return the same to the user.

SUMMARY

In view of the above, embodiments of the present disclosure provide a method for saving an L2P table saving, including steps of:

acquiring a logical block address (LBA) for which a mapping relation is updated in the L2P table in response to detecting update of the L2P table;

sending the LBA to a journal manager;

reading a corresponding physical block address (PBA) in the L2P table according to the received LBA and assembling the LBA and the corresponding PBA into delta data in response to the journal manager receiving the LBA; and saving the delta data and several basic data currently to be saved in the L2P table as a snapshot in a non-volatile memory.

In some embodiments, the method further includes:
creating a recover table; and
recording snapshot information about the snapshot into the recover table.

In some embodiments, the sending the LBA to a journal manager further includes:
storing the LBA in a LBA buffer; and
sending the LBAs in the LBA buffer to the journal manager in response to a count of the LBAs in the LBA buffer reaching a threshold.

In some embodiments, the reading a corresponding physical block address (PBA) in the L2P table according to the received LBA and assembling the LBA and the corresponding PBA into delta data in response to the journal manager receiving the LBA further includes:

reading sequentially, by the journal manager, the LBAs in the LBA buffer, obtaining corresponding PBAs according to the L2P table, and obtaining a plurality of delta data, and storing the plurality of delta data into a write buffer in sequence.

In some embodiments, the saving the delta data and several basic data currently to be saved in the L2P table as a snapshot in a non-volatile memory further includes:

acquiring several basic data currently to be saved in the L2P table and filling the several basic data currently to be saved in the L2P table into a second preset space of the write buffer in response to the delta data filling a first preset space in the write buffer; and saving the write buffer as a snapshot in the non-volatile memory in response to filling the buffer with header information about the write buffer.

In some embodiments, a count of the delta data stored in the first preset space of the write buffer is an integer multiple of the count of the LBAs stored in the LBA buffer.

In some embodiments, the method further includes:
acquiring a plurality of snapshot data from the non-volatile memory according to the snapshot information recorded in the recover table in response to receiving an instruction to recover the L2P table; and recovering, according to an order of the snapshot information in the recover table and an order of the plurality of delta data in each snapshot data, each delta data in each snapshot data into the L2P table.

Based on the same creative concept, according to another aspect of the present disclosure, an embodiment of the present disclosure further provides a system for saving a logical to physical (L2P) table, including:

an acquisition module, configured to acquire a logical block address (LBA) for which a mapping relation is updated in the L2P table in response to detecting update of the L2P table;

a sending module, configured to send the LBA to a journal manager;

an assembling module, configured to read a corresponding physical block address (PBA) in the L2P table according to the received LBA and assemble the LBA and the corresponding PBA into delta data in response to the journal manager receiving the LBA; and a save module, configured to save the delta data and several basic data currently to be saved in the L2P table as a snapshot in a non-volatile memory.

Based on the same creative concept, according to another aspect of the present disclosure, an embodiment of the present disclosure further provides a computer device, including:
at least one processor; and
a memory storing computer readable instructions executable on the processor, wherein the computer readable instructions, when executed by the processor, cause the processor to perform steps of any one of the methods described above.

Based on the same creative concept, according to another aspect of the present disclosure, an embodiment of the present disclosure further provides a computer-readable storage medium having computer-readable instructions stored thereon, wherein the computer-readable instructions, when executed by a processor, cause the processor to perform steps of any one of the methods described above.

BRIEF DESCRIPTION OF THE DRAWINGS

In order to explain technical solutions of embodiments of the present disclosure or the related art more clearly, accompanying drawings which are needed in the description of the embodiments or the related art will be briefly introduced below. Apparently, the drawings in the description below are merely some embodiments of the present disclosure, for those skilled in the art, other embodiments may be obtained based on the drawings without paying any creative effort.

DETAILED DESCRIPTION OF THE EMBODIMENTS

Figure 1:
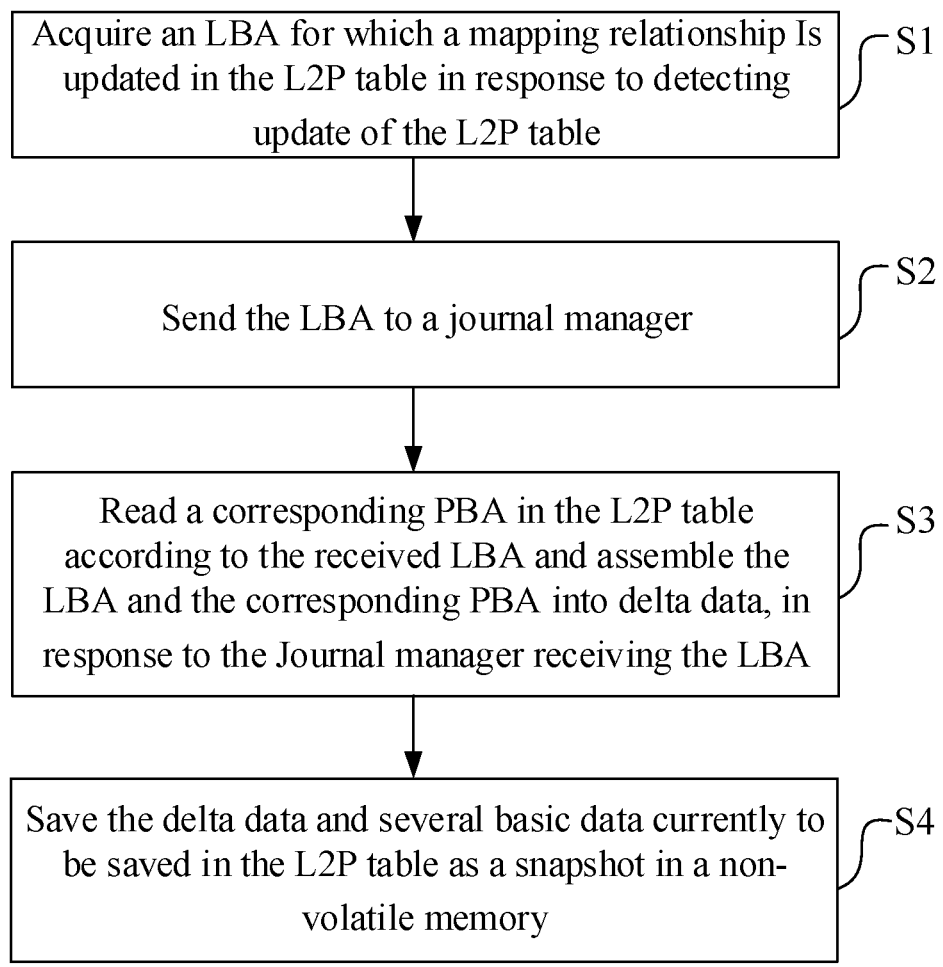
FIG. 1 is a schematic flow diagram of a method for saving an L2P table provided by an embodiment of the present disclosure.

In order to make the objects, technical solutions and advantages of the present disclosure clearer, the embodiments of the present disclosure will be further described in detail below in conjunction with specific embodiments and with reference to the accompanying drawings.

It should be noted that all the expressions "first" and "second" as used in the embodiments of the present disclosure are intended to distinguish two different entities or different parameters with the same name. That is to say, "first" and "second" are merely for the convenience of expressions and should not be construed as limiting the embodiments of the present disclosure, which will not be described in subsequent embodiments.

In embodiments of the present disclosure, WM denotes Write Manager; JM denotes Journal Manager; LBA denotes Logical Block Address; PBA denotes Physical Block Address; L2P denotes Logical To Physical Table, i.e. the FTL mapping table.

When the SSD is operating, the L2P table resides in a DDR (double data rate) for quick access by the SSD master. The L2P table can be flashed from the DDR to the FLASH when the SSD is powered down, and read from the Flash and loaded into a designated DDR area when the SSD is powered on. The size of the mapping table is 1/1024 of the capacity of SSD. The data volume of L2P table of the SSD is relatively large, for example, the L2P size of a 4 T disk is about 4 GB. As a result, although an enterprise-level SSD is configured with an energy storage capacitor, which can supply power for several tens of millisecond when an abnormal power failure occurs, the requirement of flashing the entire L2P table into the Flash cannot be met. Therefore, the SSD generally uses a snapshot method to save the L2P table, i.e., in the operating process of the SSD, when a certain time interval or a certain condition is satisfied, a snapshot of the L2P table is flashed into the FLASH. In this way, when an abnormal power failure is encountered, only a small amount of unsaved snapshots need to be flashed. After the SSD is powered on, the entire L2P table is built into the DDR based on the saved snapshots.

The real-time operating system architecture of a multi-core processor platform includes a symmetric multi-processing (SMP) architecture and an asymmetric multi-processing (AMP) architecture.

In the SSD adopting the AMP system, the whole NAND space of the SSD is divided into multiple partitions. Each of the partitions independently maintains an L2P table, and is configured with a single journal manager (JM), and a write manger (WM) responsible for data reading and writing and L2P table updating, and JM and WM are located on the same core. Inside a partition, changes to any entry of the L2P table by a manager such as WM will generate an L2P delta (LBA, PBA), and the generated L2P delta can be sent to JM sequentially, and the JM can also receive the L2P delta sequentially, to ensure that delta data can be stored with an order preserved.

However, in the SSD adopting the SMP system, it is no longer strictly configured the partitions for better read-write performance. Multiple WMs on different cores will access the L2P table in parallel and send L2P table updates to the JM via messages. This leads to a problem that how to store the L2P delta with order preserving by the JM. The above-mentioned problem can be solved by means of a mutex in an existing solution, i.e. a 16K write buffer is considered as a shared resource, which can be seen by all WMs, in response to determining that any WM updates the L2P table, before flashing the delta into the write buffer, it is necessary to first apply for a mutex lock, and the delta can only be written in after the lock is obtained, and the mutex lock is released after the writing; if no mutex lock is available, it will wait until a lock is available. However, after evaluation and measurement, the consumption of a system in which multiple WMs using the mutex lock is too large, which directly affects the read-write performance.

In the embodiments of the present disclosure, for a certain LBA, it is updated as delta0 (LBA, PBA0) by WM0 at a first time, and it is updated as delta1 (LBA, PBA1) by WM1 at a second time; and if there is no update for the LBA later, an entry corresponding to the LBA in the L2P table is PBA1. According to the order-preserving requirement of JM storage, the JM needs to store delta0 (LBA, PBA0) in the delta buffer first, and then store delta1 (LBA, PBA1). If it is sent via messages, i.e., WM0 sends delta0 (LBA, PBA0), and WM1 sends delta1 (LBA, PBA1), since JM makes a round query on each core to see whether there is a message in the inbound on the core where the current JM is located, it is hard to guarantee that the JM will receive the message of delta0 first and then receive the message of delta1. Assuming that the JM receives the message of delta1 first, saves the same, and then receives the message of delta0 and saves the same, then in the power-on recovery process, the JM will first complete the patch of delta1 and then complete the patch of delta0. As a result, in the L2P table finally recovered, the entry corresponding to the LBA is PBA0, which is inconsistent with the entry PBA1 corresponding to the LBA in the L2P table before power off, that is, resulting in a problem of out-of-order storage.

According to an aspect of the present disclosure, an embodiment of the present disclosure provides a method for saving an L2P table. As shown in FIG. 1, the method may include steps described below.

At S1, an LBA, for which a mapping relation is updated, in the L2P table is acquired in response to detecting update of the L2P table.

At S2, the LBA is sent to a journal manager.

At S3, in response to the journal manager receiving the LBA, a corresponding PBA is read from the L2P table according to the received LBA, and the LBA and the corresponding PBA are assembled into delta data.

At S4, the delta data and several basic data currently to be saved in the L2P table are saved as a snapshot in a non-volatile memory.

As used herein, a Journal manager (JM) is a software module in a SSD firmware, and is primarily responsible for the management of metadata such as L2P tables.

In view of adopting a conventional method of sending delta (LBA, PBA) when saving an L2P update by the SSD of the SMP system, which will cause a problem that the delta data is saved out of order or the performance degrades due to a mutually mutex storage method, the present disclosure proposes a method, in which only LBA for which the L2P is updated is sent to the JM, the JM accesses the L2P table to obtain the PBA based on the received LBA, assembles the PBA and LBA into an delta (LBA, PBA) and then saves the same, thereby effectively solving the problem that the delta is saved out of order. Therefore, by only sending the LBA, since the JM always obtains the real-time PBA value from the L2P table according to the LBA, the JM does not have the problem of out-of-order storage as long as WM does not miss sending.

In some embodiments, the method further includes:
creating a recover table; and
recording snapshot information about the snapshot into the recover table.

After a snapshot is flashed into the NAND, a mapping relation is generated, i.e., the relationship between JM_LBA and single-level cell (SLC) NAND address for storing the snapshot, and this mapping relation is recorded into the recover table (also known as a First table, i.e., a linear table with the JM_LBA as an index and the SLC NAND address as the contents).

Specifically, the recover table, for example the First table, can be created and maintained in the JM. Once a snapshot is flashed into the NAND by the JM, a new mapping relation, that is, the relationship between JM_LBA and SLC NAND address for storing the snapshot, is formed, and the mapping relation is recorded into the First table. The First table is a linear table having JM_LBA as the index and having SLC NAND address as the content. When recovering the L2P table once the JM is powered on, the snapshot data to be recovered will be obtained in the non-volatile memory according to the mapping relationship recorded in the First table. The snapshot information may include the SLC NAND address.

In some embodiments, in step S2, the LBA is sent to the journal manager by:
storing the LBA in a LBA buffer; and
sending the LBA buffer to the journal manager in response to the count of the LBAs in the LBA buffer reaching a threshold.

In some embodiments, a SSD based on the SMP system can be configured with: 4 or 8 WMs that are distributed on different cores and responsible for the maintenance and update of the L2P table; and 1 JM that is distributed on a certain fixed core and responsible for the storage of update data delta of the L2P table. Each WM may apply for a LBA buffer to the buffer manager for storing the LBA for which the L2P table is updated, each LBA occupying 4 bytes. After the WM applied and obtained one LBA buffer, the LBAs generated by updating the L2P table are sequentially stored in the LBA buffer, and when the LBA buffer is full, the count information of the LBAs stored in the LBA buffer and the buffer address are sent to the JM via a message. After receiving the message, the JM obtains the buffer address, sequentially reads the LBAs in the buffer, then accesses the L2P table to obtain the PBAs, assembles the same into a delta (LBA, PBA), and then saves the delta (LBA, PBA). The WM sends L2P table updated data to the JM by means of the LBA buffer, which can greatly reduce the interaction frequency and consumption of messages, and is beneficial to the improvement of SSD performance compared with the situation where the L2P updated data is sent once the L2P is updated.

In some embodiments, in step S3, in response to the journal manager receiving the LBA, a corresponding PBA is read from the L2P table according to the received LBA, and the LBA and the corresponding PBA are assembled into delta data as follows.

The journal manager reads the LBAs in the LBA buffer sequentially to obtain corresponding PBAs through the L2P table and further obtain a plurality of delta data, and stores the plurality of delta data in a write buffer in sequence. The plurality of delta data may be stored in the write buffer in sequence as follows: storing the delta data in sequence of reading the LBAs in the LBA buffer, and saving the delta data in a JM write buffer.

In some embodiments, the count of delta data stored in a first preset space of the write buffer is an integer multiple of the count of LBAs stored in the LBA buffer.

In some embodiments, the JM is configured with several 16k write buffers for storing the received L2P updated data. In some embodiments, the count of deltas stored by a single write buffer is just an integer multiple of the count of LBAs stored by a single LBA buffer. In some embodiments, the LBAs needed to fill a single LBA buffer may just fill a single write buffer of the JM. Once receiving the LBA buffer, the JM reads the LBAs in turn and obtains PBAs in the L2P table, assembles deltas (LBA, PBA) and stores the deltas (LBA, PBA) in turn in the delta buffer in the write buffer. Normally, after one LBA Buffer has been processed, one write buffer's delta buffer is full. The LBA buffer is released by the JM so that it can be continued used by the WM. The JM continues to fill buffer header information and base data, which can be sent to a NAND controller to be flashed into the FLASH.

It should be noted that, when different WMs make multiple modifications on the same LBA, the LBA is sent to the JM for multiple times (same as the number of modifications). In the way, when receiving the LBA sent by any WM, the JM can acquire real-time PBA data through the L2P table. Although it can not be determined whether the currently acquired PBA data is the latest PBA data, the last acquired data must be the latest data. For example, at a first time, the delta data is updated as delta0 (LBA1, PBA0) by WM0, and at a second time, the delta data is updated as delta1 (LBA1, PBA1) by WM1, and the JM will receive LBA1 twice; after LBA1 is received for the first time, depending on delay conditions for sending messages of different WMs, the PBA queried based on the LBA1 may be PBA0 or PBA1. However, since the LBA will be sent only after updating the data in the L2P table, after the LBA is received for the second time, the corresponding PBA queried by the JM according to the L2P table must be PBA1. Accordingly, when performing recovery according to the order of snapshot data and the order of the delta data, the delta data (LBA1, PBA0) is recovered first, and the delta data (LBA1, PBA1) is recovered later. In this way, it can be ensured that the entry corresponding to the LBA is PBA1 in a final L2P table where the recovery is completed, which is consistent with the entry PBA1 corresponding to the LBA in the L2P table before power off, and the JM does not have the problem of out-of-order storage.

In some embodiments, in step S4, the delta data and several basic data currently to be saved in the L2P table are saved as a snapshot in a non-volatile memory as follows:

acquiring several basic data currently to be saved in the L2P table and filling the basic data into a second preset space of the write buffer in response to the first preset space in the write buffer being filled with the delta data; and saving the write buffer as a snapshot in the non-volatile memory in response to filling the write buffer with header information.

In some embodiments, the metadata is saved in the SSD in a snapshot of delta+base. Delta denotes delta data derived from base data. For example, the entire L2P table in DDR is called as base data. If an entry (LBA0, PBA0) in the L2P table is updated as (LBA0, PBA1), then (LBA0, PBA1) is an L2P type delta data. The reading and writing of the NAND are performed in units of a page, and the size of a single current snapshot is the size of a page in the SLC mode (in the case where the NAND is used in the SLC mode, the size of the page is 16 KiB). A single snapshot is composed of 3 parts, which are formed in SSD DDR in the form of write buffer, and include a header, a delta buffer and a base buffer. The entire L2P table is segmented according to the size of the base buffer, and each segment is referred to as "several basic data to be saved currently". The metadata is saved in the SLC, and several 16k-sized write buffers are developed in the DDR. The first 64 bytes of each write buffer is used for buffer header information, the immediately followed delta buffer (the first preset space) is used for caching the generated delta data; and the remained base buffer (the second preset space) (size=16k–64 bytes buffer header–delta buffer size) is used for saving a piece of base data.

It should be noted that the entire L2P table can be divided into multiple pieces of base data according to the size of the base buffer, and the delta data is for the entire L2P table. Therefore, after the delta data fills the first preset space, one segment of base data is successively and cyclically filled into the base buffer of the current write buffer, and the delta data in the current write buffer may correspond to the base data of other segments and may also correspond to the base data in the current write buffer. In this way, the updated L2P data is either saved in the delta buffer or in the base buffer, so that data, that is later in chronological order, in the recovery table is more recent.

In some embodiments, the method further includes:

acquiring a plurality of snapshot data from the non-volatile memory according to snapshot information recorded in the recover table, in response to receiving an instruction to recover the L2P table; and recovering each delta data in each snapshot data into the L2P table according to an order of the snapshot information in the recovery table and an order of a plurality of delta data in each snapshot data.

In some embodiments, when the JM is powered on to recover the L2P table, it will read the stored 16K data in sequence according to the First table (the new mapping relation, formed by flashing a 16K write buffer by the JM, is recorded into the first table, and the table is maintained internally by JM). After the recovery of one piece of 16K data to DDR is completed, the base data will be transferred to its' actual position in the L2P table first; after the Base is recovered, delta (LBA, PBA) data is read in turn, an entry address of the L2P table is obtained according to the LBA, the PBA is written to complete a patch of a single delta. When all 16k mapping relations recorded in the first table have been read and the base and patch processes described above have been completed, the entire L2P table is built in DDR.

In view of adopting a conventional method of sending delta (LBA, PBA) when saving an L2P update by the SSD of the SMP system, which will cause a problem that the delta data is saved out of order or the performance degrades due to a mutually mutex storage method, the present disclosure proposes a method, in which only LBA for which the L2P is updated is sent to the JM, the JM accesses the L2P table to obtain the PBA based on the received LBA, assembles the PBA and LBA into an delta (LBA, PBA) and then saves the same, thereby effectively solving the problem that the delta is saved out of order. Therefore, by only sending the LBA, since the JM always obtains the real-time PBA value from the L2P table according to the LBA, the JM does not have the problem of out-of-order storage as long as WM does not miss sending.

Figure 2:
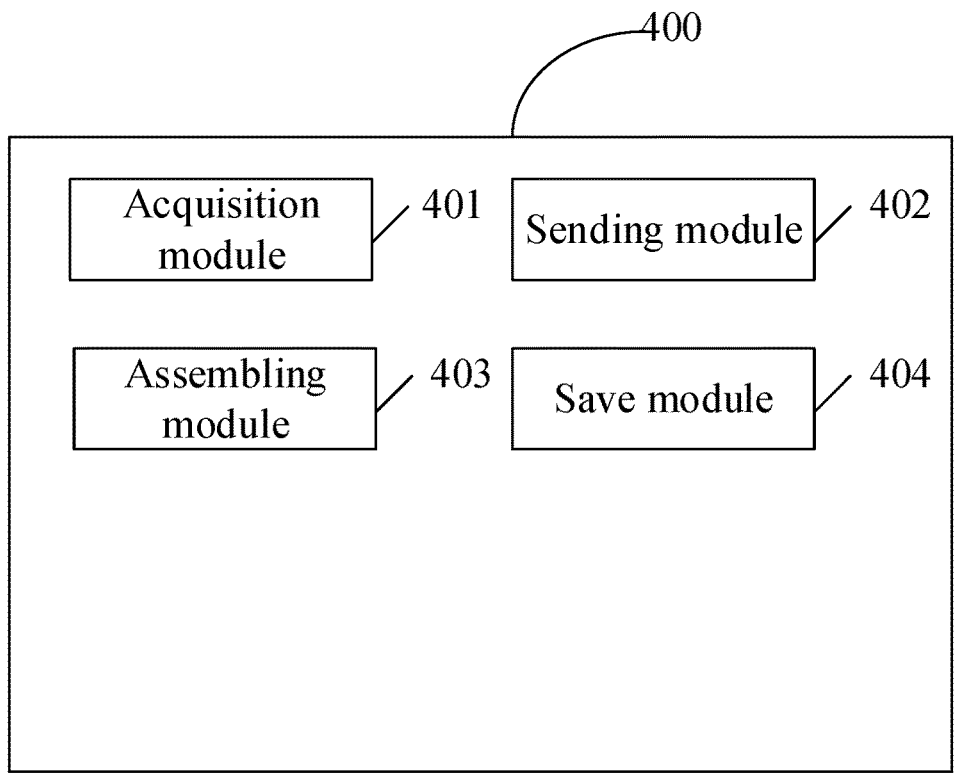
FIG. 2 is a schematic structural diagram illustrating a system for saving an L2P table provided by an embodiment of the present disclosure.

Based on the same creative concept, according to another aspect of the present disclosure, embodiments of the present disclosure further provide a system 400 for saving an L2P table. As shown in FIG. 2, the system includes an acquisition module 401, a sending module 402, an assembling module 403 and a save module 404.

The acquisition module 401 is configured to acquire an LBA for which a mapping relationship is updated in the L2P table in response to detecting update of the L2P table.

The sending module 402 is configured to send the LBA to a journal manager.

The assembling module 403 is configured to: in response to the journal manager receiving the LBA, read a corresponding PBA in the L2P table according to the received LBA, and assemble the LBA and the corresponding PBA into delta data.

The save module 404 is configured to save the delta data and several basic data currently to be saved in the L2P table as a snapshot in a non-volatile memory.

Figure 3:
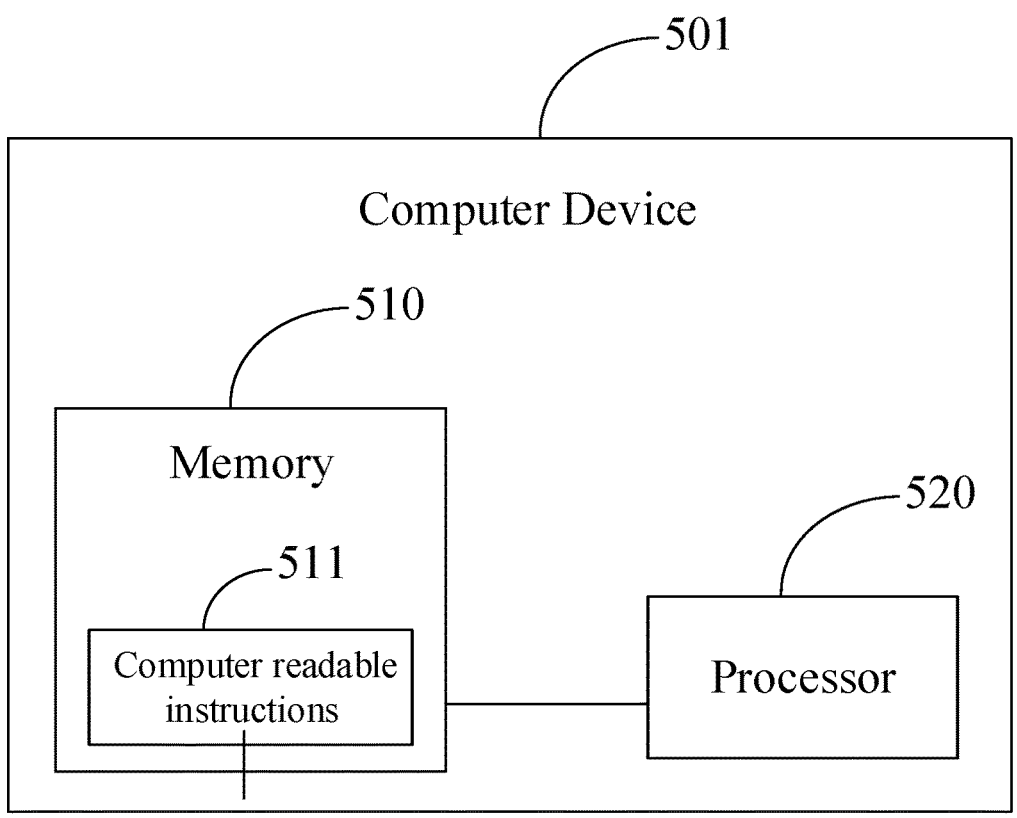
FIG. 3 is a schematic structural diagram illustrating a computer device provided by an embodiment of the present disclosure.

Based on the same creative concept, according to another aspect of the present disclosure, as shown in FIG. 3, an embodiment of the present disclosure further provides a computer device 501, including:

at least one processor 520; and a memory 510 storing computer readable instructions 511 executable on the processor, when executing the readable instructions, the processor 520 performs the steps of any of the above methods for saving the L2P table.

Figure 4:
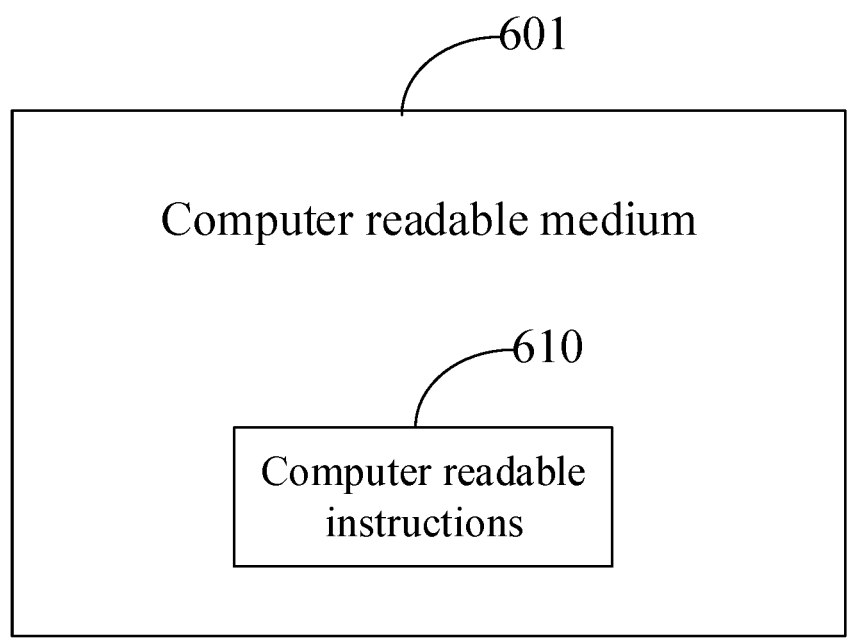
FIG. 4 is a schematic structural diagram illustrating a computer-readable storage medium provided by an embodiment of the present disclosure.

Based on the same creative concept, according to another aspect of the present disclosure, as shown in FIG. 4, an embodiment of the present disclosure further provides a nonvolatile computer-readable storage medium 601 storing computer-readable instructions 610 that, when executed by a processor, perform the steps of any one of the above methods for saving an L2P table.

Finally, it should be noted that those skilled in the art can understand that all or part of the processes in the methods of the above embodiments can be implemented by instructing related hardware through computer-readable instructions. The readable instructions can be stored in a computer-readable memory, the readable instructions, when being executed, may include the processes of the embodiments of the above-mentioned methods.

In addition, it should be appreciated that the computer-readable storage medium (e.g., a memory) herein can be either volatile memory or nonvolatile memory, or can include both volatile memory and nonvolatile memory.

Those skilled in the art would also appreciate that various illustrative logical blocks, modules, circuits, and algorithm steps described in connection with the disclosure herein may be implemented as electronic hardware, computer software, or combinations of both. To clearly illustrate the interchangeability of hardware and software, various illustrative components, blocks, modules, circuits, and steps have been described generally in terms of their functionality. Whether such functionality is implemented as software or as hardware depends upon the particular application and design constraints imposed on the overall system. Those skilled in the art may implement the functions in various ways for each specific application, but such implementation decisions should not be interpreted as causing a departure from the scope disclosed in the embodiments of the present disclosure.

The above are exemplary embodiments of the present disclosure, but it should be noted that various changes and modifications can be made without departing from the scope of the embodiments of the present disclosure defined in the claims. The functions, steps and/or actions of the method claims in accordance with the disclosed embodiments described herein need not be performed in any particular order. In addition, although the elements disclosed in the embodiments of the present disclosure may be described or claimed in an individual form, they may also be understood as multiple unless explicitly limited to be a singular number.

It should be understood that as used herein, the singular form "a" and "an" are intended to include the plural forms as well, unless the context clearly supports an exception. It should also be understood that "and/or" as used herein is meant to include any and all possible combinations of one or more of the associated listed items.

The serial numbers of the embodiments disclosed in the above-mentioned embodiments are only for description, and do not represent the advantages and disadvantages of the embodiments.

Those skilled in the art can understand that all or part of the steps for implementing the above-mentioned embodiments can be completed by hardware, or by instructing related hardware based on computer-readable instructions. The computer-readable instructions can be stored in a non-volatile computer-readable storage medium, and the storage medium may be a read-only memory, a magnetic disk or an optical disk, and the like.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A method for storing a logical to physical (L2P) table, comprising:
   detecting the L2P table, in response to detecting update of the L2P table, acquiring a logical block address (LBA) for which a mapping relation is updated in the L2P table;
   sending the LBA to a journal manager;
   reading a corresponding physical block address (PBA) in the L2P table according to the received LBA and assembling the LBA and the corresponding PBA into delta data in response to the journal manager receiving the LBA; and
   saving the delta data and several basic data currently to be saved in the L2P table as a snapshot in a non-volatile memory.

2. The method according to claim 1, further comprising:
   creating a recover table; and
   recording snapshot information about the snapshot into the recover table.

3. The method according to claim 2, further comprising:
   acquiring a plurality of snapshot data from the non-volatile memory according to the snapshot information recorded in the recover table in response to receiving an instruction to recover the L2P table; and
   recovering, according to an order of the snapshot information in the recover table and an order of the plurality of delta data in each snapshot data, each delta data in each snapshot data into the L2P table.

4. The method according to claim 2, wherein the recover table is a linear table with JM_LBA as an index and SLC NAND address for storing the snapshot as content.

5. The method according to claim 4, wherein the snapshot information comprises the SLC NAND address.

6. The method according to claim 1, wherein the sending the LBA to a journal manager further comprises:
   storing the LBA in a LBA buffer; and
   sending the LBAs in the LBA buffer to the journal manager in response to a count of the LBAs in the LBA buffer reaching a threshold.

7. The method according to claim 6, wherein the reading a corresponding physical block address (PBA) in the L2P table according to the received LBA and assembling the LBA and the corresponding PBA into delta data in response to the journal manager receiving the LBA further comprises:
   reading sequentially, by the journal manager, the LBAs in the LBA buffer, obtaining corresponding PBAs according to the L2P table, and obtaining a plurality of delta data, and storing the plurality of delta data into a write buffer in sequence.

8. The method according to claim 7, wherein the saving the delta data and several basic data currently to be saved in the L2P table as a snapshot in a non-volatile memory further comprises:
   acquiring several basic data currently to be saved in the L2P table and filling the several basic data currently to be saved in the L2P table into a second preset space of the write buffer in response to filling a first preset space in the write buffer with the delta data; and
   saving the write buffer as a snapshot in the non-volatile memory in response to filling the buffer with header information about the write buffer.

9. The method according to claim 8, wherein a count of the delta data stored in the first preset space of the write buffer is an integer multiple of the count of the LBAs stored in the LBA buffer.

10. The method according to claim 8, wherein the snapshot is composed of 3 parts, that are formed in the form of write buffer, and comprises a header, a delta buffer and a base buffer.

11. The method according to claim 10, wherein the L2P table is segmented according to a size of the base buffer, and each segment is one of the several basic data to be saved currently.

12. The method according to claim 11, wherein the filling the several basic data currently to be saved in the L2P table into a second preset space of the write buffer comprises filling one segment of base data successively and cyclically into the base buffer of the current write buffer, and the delta data in the current write buffer corresponds to the base data of other segments or the base data in the current write buffer.

13. The method according to claim 7, wherein the storing the plurality of delta data into a write buffer in sequence comprises: storing the delta data into the write buffer in sequence of reading the LBAs from the LBA buffer.

14. The method according to claim 13, wherein the journal manager is configured with several 16k write buffers for storing the received L2P updated data.

15. The method according to claim 14, wherein the count of delta data stored by a single write buffer is an integer multiple of the count of LBAs stored by a single LBA buffer.

16. The method according to claim 15, wherein after storing the plurality of delta data into the write buffer, the LBA buffer is released by the journal manager.

17. The method according to claim 6, wherein when the LBA buffer is full, the count of the LBAs stored in the LBA buffer and buffer address are sent to the journal manager via a message.

18. The method according to claim 1, wherein the journal manager is a software module in an SSD firmware, and is responsible for management of L2P tables.

19. A non-volatile computer-readable storage medium having computer-readable instructions stored thereon, wherein the computer-readable instructions, when executed by a processor, cause the processor to perform operations of:

detecting a logical to physical (L2P) table, in response to detecting update of the L2P table, acquiring a logical block address (LBA) for which a mapping relation is updated in the L2P table;

sending the LBA to a journal manager;

reading a corresponding physical block address (PBA) in the L2P table according to the received LBA and assembling the LBA and the corresponding PBA into delta data in response to the journal manager receiving the LBA; and saving the delta data and several basic data currently to be saved in the L2P table as a snapshot in a non-volatile memory.

20. A computer device, comprising:

at least one processor; and a memory storing computer readable instructions executable on the processor, wherein the computer readable instructions, when executed by the processor, cause the processor to perform operations of:

detecting a logical to physical (L2P) table, in response to detecting update of the L2P table, acquiring a logical block address (LBA) for which a mapping relation is updated in the L2P table;

sending the LBA to a journal manager;

reading a corresponding physical block address (PBA) in the L2P table according to the received LBA and assembling the LBA and the corresponding PBA into delta data in response to the journal manager receiving the LBA; and saving the delta data and several basic data currently to be saved in the L2P table as a snapshot in a non-volatile memory.

\* \* \* \* \*